Sept. 10, 1968　　　　　L. B. S. HEROU　　　　　3,400,973
SUPERSTRUCTURE FOR LOAD VEHICLES
Filed Sept. 1, 1966　　　　　　　　　　　　　5 Sheets-Sheet 1
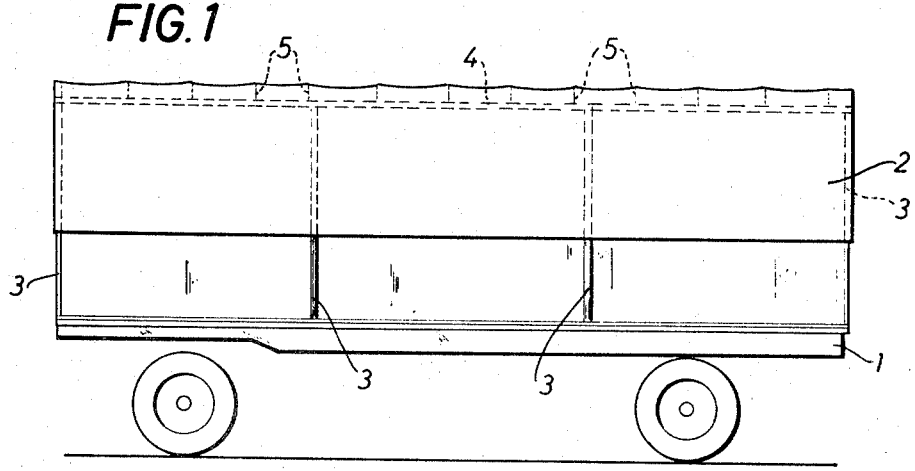
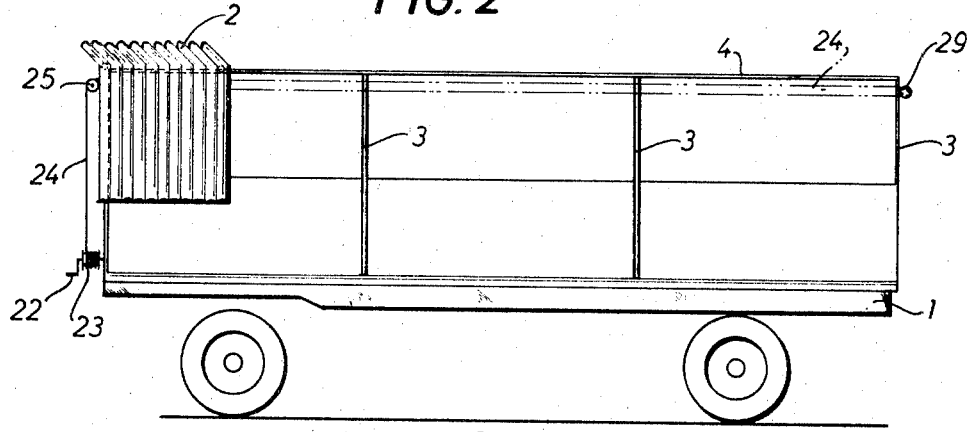
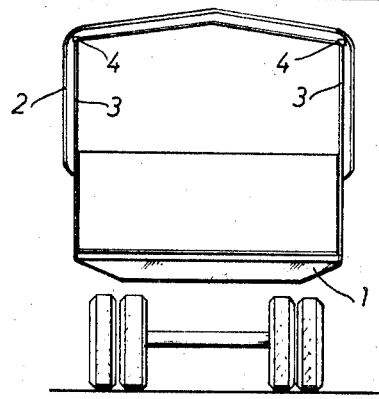
INVENTOR
LARS BÖRJE SVANTE HEROU
BY Linton and Linton
ATTORNEYS Sept. 10, 1968 L. B. S. HEROU 3,400,973
SUPERSTRUCTURE FOR LOAD VEHICLES
Filed Sept. 1, 1966 5 Sheets-Sheet 2

INVENTOR
LARS BÖRJE SVANTE HEROU

BY *Linton and Linton*
ATTORNEYS

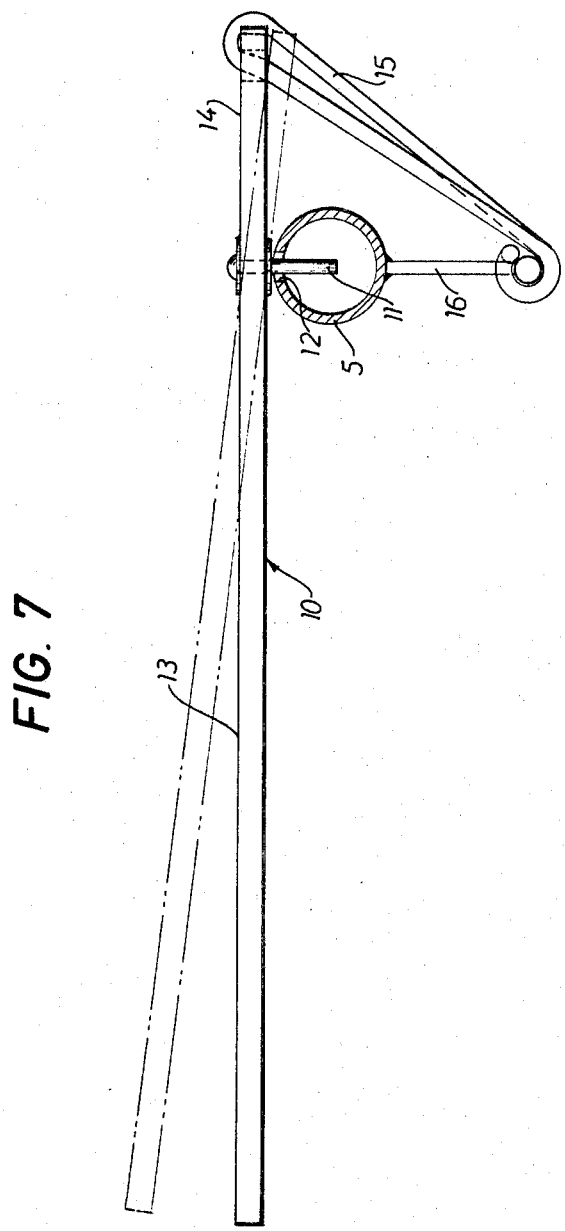

Sept. 10, 1968  L. B. S. HEROU  3,400,973
SUPERSTRUCTURE FOR LOAD VEHICLES
Filed Sept. 1, 1966  5 Sheets-Sheet 5

INVENTOR
LARS BÖRJE SVANTE HEROU
BY Linton and Linton
ATTORNEYS

United States Patent Office 3,400,973
Patented Sept. 10, 1968

3,400,973
SUPERSTRUCTURE FOR LOAD VEHICLES
Lars Börje Svante Herou, 24 Slatvarsgatan,
Vastra Frolunda, Sweden
Filed Sept. 1, 1966, Ser. No. 576,589
Claims priority, application Sweden, Apr. 28, 1966,
5,765/66
12 Claims. (Cl. 296—100)

ABSTRACT OF THE DISCLOSURE

The present invention relates to superstructures for load vehicles and of the kind comprising a flexible covering supported by a frame, the roof-supporting portion of which comprises a number of cross-pieces connected to the covering in spaced relationship and having their ends supported in such a manner by longitudinally extending rails or the like that the cross-pieces are displaceable for folding or collapsing the covering.

Description

Hitherto known superstructures of the kind set forth above suffer from the inconvenience that when the cross-pieces are displaced towards one end of the superstructure, the portions of the covering disposed between the cross-pieces will sag down in the spaces between the cross-pieces and will be folded or crumpled in an uncontrolled manner, so that on the one hand the displacing of the cross-pieces will be hampered and on the other hand the covering will also in the collapsed condition cover a comparatively large part of the loading area. Further, the goods to be transported is usually stacked to a height as close to the roof of the covering as possible for the purpose of utilizing the load capacity of the vehicle, and goods stacked in this manner will prevent the portions of the roof of the covering disposed between the cross-pieces to sag freely downwards. Thus, said portions of the roof will slide against the upper surface of the goods when the cross-pieces are displaced, resulting in a comparatively large friction which must be overcome during displacement of the cross-pieces.

The object of the invention is to eliminate the above-mentioned draw-backs by providing a device, which makes it possible to rapidly and conveniently push the covering into the folded or collapsed state and to pull it out again, whereby the covering, when in its collapsed state, will cover a considerably smaller portion of the loading space than in previously known superstructures of this kind.

The invention is substantially characterised in that said cross-pieces are provided with arms pivoted thereon and extending transversely of said cross-pieces and which are influenced by a force, which tends to swing the arms upwardly, so that when the cross-pieces are displaced for collapsing the cover, the portions thereof disposed between the cross-pieces will be brought upwardly by said arms for forming folds disposed above a plane through said cross-pieces. Due to this arrangement a controlled folding of the portions of the covering roof disposed between the cross-pieces will be obtained, and at the same time said portions will be prevented from touching the goods stacked below the roof.

According to the invention, said arms may be inserted into pockets provided at the under side of the roof portion of the covering.

According to one embodiment of the invention each of said arms is comprised of one of the arms of a double-armed lever swingably mounted on each cross-piece, the other and shorter arm of said double-armed lever having connected thereto one end of a draw spring or the like, the opposite end of which is secured to an attachment projecting from the cross-piece.

The double-armed lever may preferably be in the form of an elongated plate disposed above the cross-piece. The lever may then be pivoted to the cross-piece by means of a stud or the like projecting from the lower side of the lever and engaging in an opening in the cross-piece, said opening having such dimensions that the stud is rockable therein for allowing the lever to swing relative to the cross-piece.

Each cross-piece is preferably provided with several fold-forming arms distributed along the cross-piece. Two such arms on each cross-piece are preferably disposed one adjacent each of the ends of the cross-piece and are advantageously each provided at the free end with a lateral projection directed towards the adjacent sidewall portion of the covering.

According to the invention, the length of the arms is preferably equal to or slightly less than half the distance between two adjacent cross-pieces in the extended position of the covering.

In one embodiment of the arrangement according to the invention each cross-piece is provided with abutments intended, when the cross-pieces are displaced for collapsing the covering, to cooperate with abutments provided on the adjacent cross-piece in the direction of displacement. Folding and displacement of the covering may then be effected by means of an operating wire which has one end connected to a wind-up drum or the like disposed at that end of the vehicle towards which the covering is adapted to be pushed and which has its opposite end connected to the cross-piece farthest from said end of the load vehicle.

According to the invention, the operating wire may then be detachably connected to said cross-piece and a pulley or the like may be provided at that end of the load vehicle, which is opposite to the end towards which the covering is adapted to be pushed for the purpose of allowing the operating wire, after detachment from said cross-piece to be passed around said pulley and thereafter connected anew to said cross-piece in order to extend the covering from the pushed-together position.

One embodiment of the invention will be described in greater detail herebelow with reference to the accompanying drawings, wherein:

FIGURE 1 is a side view of a load vehicle provided with a superstructure according to the invention and illustrating the covering in its extended position in which it covers the loading space;

FIGURE 2 is a view corresponding to FIGURE 1 showing the covering pushed together and displaced to one side;

FIGURE 3 is a rear view of the load vehicle;

FIGURE 7 is a view taken on the line VII—VII in FIGURE 6;

Figure 4:
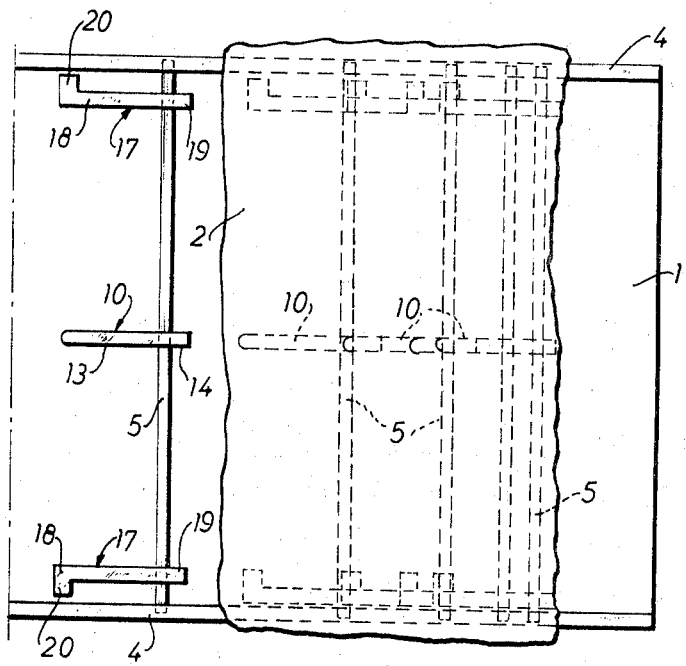
FIGURE 4 is a view from above to a larger scale of a portion of the roof of the superstructure.

The trailer shown in FIGURES 1–3, inclusive, is pro-platform 1 for supporting a covering 2 of tarpaulin cloth vided with a supporting frame projecting above the load or some other material suited for this purpose. The supporting frame includes a number of spaced uprights 3 projecting from the longitudinal sides of the load platform, said uprights at each side of the vehicle being interconnected at their upper ends by means of a longitudinal rail 4. Between the two longitudinal rails 4 there are provided a number of cross-pieces 5, which are angled at the middle to give a crest-like shape to the roof portion of the covering supported by the frame. The cross-pieces 5 which are spaced from one another along the frame are connected in any suitable manner with the roof portion of the covering cloth at regular intervals, for instance by means of ribbons or the like stitched to the roof portion of the covering at the under side thereof. The cross-pieces 5 have their ends displaceably carried by the rails 4, so that by displacing the cross-pieces towards one end of the frame the covering may be pushed to said end of the frame as shown in FIGURE 2.

Figure 9:
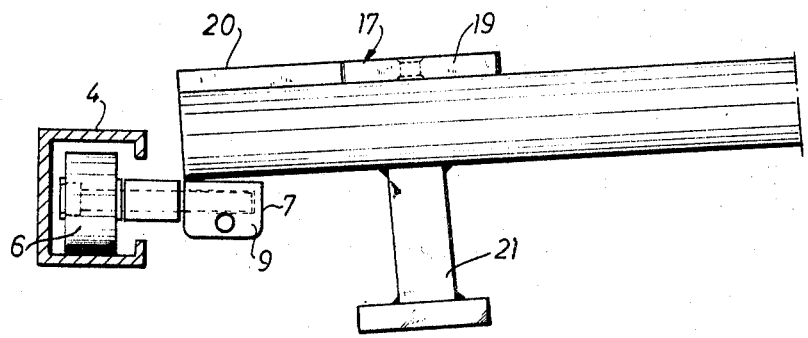
FIGURE 9 is a view taken on the line IX—IX in FIGURE 8.
Figure 8:
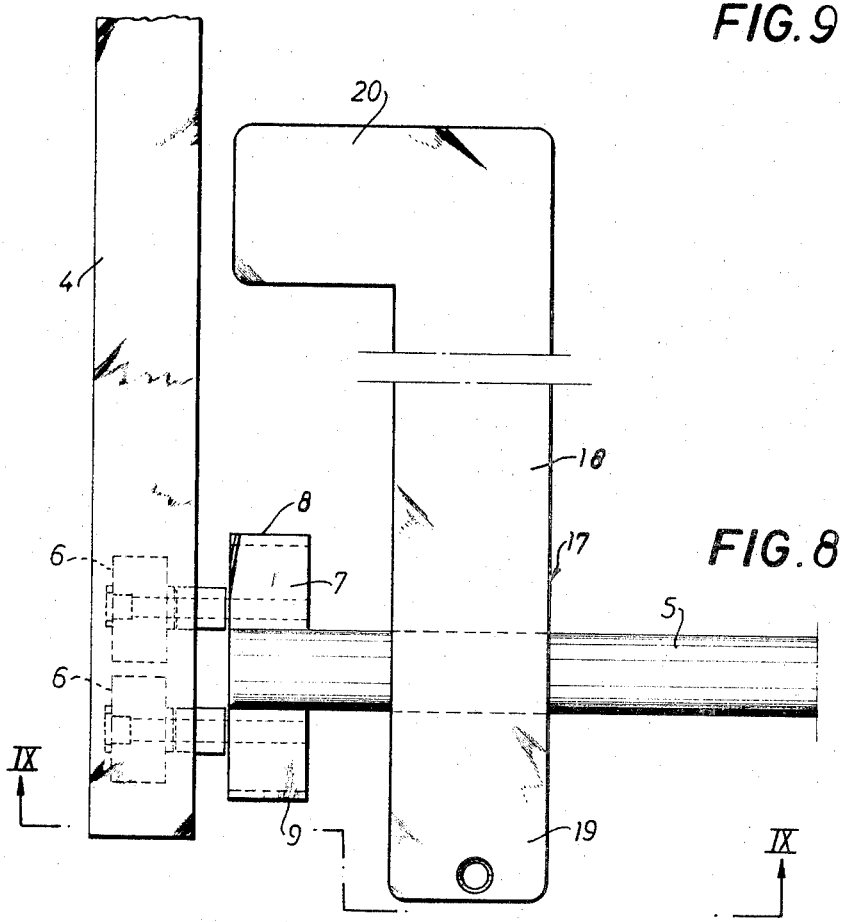
FIGURE 8 is a view from above showing one end portion of one of the cross-pieces and a fold-forming arm of another embodiment than that shown in FIGURE 6.

As will appear from FIGURES 8 and 9, the longitudinal rails have a substantially U-shaped cross-section with the open sides facing one another, and the cross-pieces 5 which in the embodiment shown are made from tubing are provided at their ends with rollers 6 disposed inside of the U-shaped rails and running against the lower flange thereof. Each end of each of the cross-pieces is provided with two wheels 6 which are freely rotatably journalled at an elongate plate 7 parallel with the rails 4 and connected to the end of the cross-piece for instance by welding, said plate extending at both ends in front of and rearwardly of, respectively, the front and rear delimiting plane, respectively, for the rolls and having at each end an end portion 8 and 9, respectively, bent at right angles to the plate.

In the description following it will be assumed that the covering of the superstructure is adapted to be displaced towards the front end of the load vehicle (the left end according to FIGURE 2). However, the covering may of course be adapted, in the pushed-together state, to be positioned at the rear end of the load vehicle or for instance at the middle portion thereof, so that expressions like "forward," "rear," "towards the front end," etc. used herebelow should be understood to refer only to the arrangement illustrated in FIGURE 2.

At the middle portion of each of the tubular cross-pieces 5 there is provided, above the cross-piece and transversely thereof, an elongated plate 10 which is provided, adjacent one end, with a pin 11, which extends into the tubular cross-piece through an opening 12 in the upper ends thereof, said opening having a width considerably larger than the diameter of the pin 11, so that the pin will be rockable relative to the cross-piece, whereby the plate 10 forms a double-armed lever pivoted on the cross-piece and having a longer arm 13 and a shorter arm 14, the latter arm being connected with an elastic rubber cord 15 which is secured at its opposite end to an attachment 16 welded to the lower side of the tubular cross-piece 5. The rubber cord 15 tends to swing the plate 10 in a clockwise direction according to FIGURE 7 from the position shown in full lines. The position of the plate 10 indicated in broken lines in FIGURE 7 is a position in which the plate has been partly swung under the influence of the rubber cord 15. The maximum swinging movement is considerably larger as will appear from the following. Apart from the plate 10 each cross-piece 5 is provided adjacent each end with a further plate 17 generally similar to the plate 10 and pivotally mounted at the cross-piece in the same manner as the plate 10 and influenced by a rubber cord (see FIGURES 4, 8 and 9). In FIGURES 8 and 9 the pin corresponding to the pin 11 for pivoting the plate to the cross-piece and the rubber cord have been left out for the sake of clarity.

The plates 17 differ in shape from the plates 10 in that they are provided at the free end of the longer lever arm 18 with a portion 20 directed towards the adjacent sidewall portion of the superstructure. The attachment on the cross-piece 5 for the rubber cord (not shown) connected to the shorter arm 19 of the plate 17 is indicated at 21 in FIGURES 8 and 9.

The forwardly directed longer lever arms 13 and 18 of the plates 10 and 17, respectively, pivoted to the cross-pieces 5 are preferably connected with the roof portion of the covering cloth, for instance by means of pockets, straps or the like (not shown in the drawings) in which said lever arms are inserted.

The function of the plates 10 and 17 pivoted on the cross-pieces 5 is as follows. When the covering 2 is in its extended position covering the loading space and the cross-pieces are thus equally distributed along the superstructure (see FIGURE 1), the plates 10 and 17 will be maintained by the tension in the covering cloth in a substantially horizontal position against the action of the rubber cords acting upon the plates, said horizontal position being represented by the position shown in full lines in FIGURE 7. When the cross-pieces 5 are displaced forwardly for pushing the covering towards the front end of the load vehicle the plates 10 and 17 will be swung under the influence of the rubber cords in such a direction that the forwardly directed lever arms 13 and 18, respectively, which are preferably connected with the roof portion of the cloth will be swung upwardly from the horizontal direction and thereby move the portions of the roof portion of the covering disposed between the crosspieces upwardly, so that said portions of the roof portion of the covering will be formed into regular folds in the manner illustrated in FIGURE 2. In order to ensure the uniform folding the portions 13 and 18 of the plates 10 and 17, respectively, which form the forwardly directed longer lever arms preferably have a length equal to or slightly less than half the distance between two adjacent cross-pieces 5 in the extended position of the covering. The laterally directed portions 20 of the arms 13 serve the purpose of raising the portions of the covering roof disposed between the cross-pieces adjacent the sides of the covering for ensuring a uniform folding all the way out to the sides of the roof. When the covering is drawn out from the position shown in FIGURE 2 to the position shown in FIGURE 1 the plates 10 and 17 are swung back under the influence of the tensioning of the covering cloth to their substantially horizontal position against the action of the rubber cords acting upon the plates.

Figure 5:
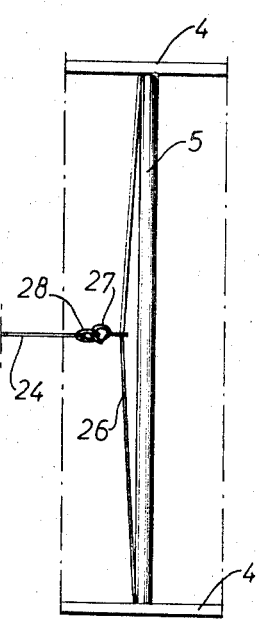
FIGURE 5 is a diagrammatic view showing the connection between an operating wire and one of the cross-pieces included in the roof portion of the superstructure.
Figure 6:
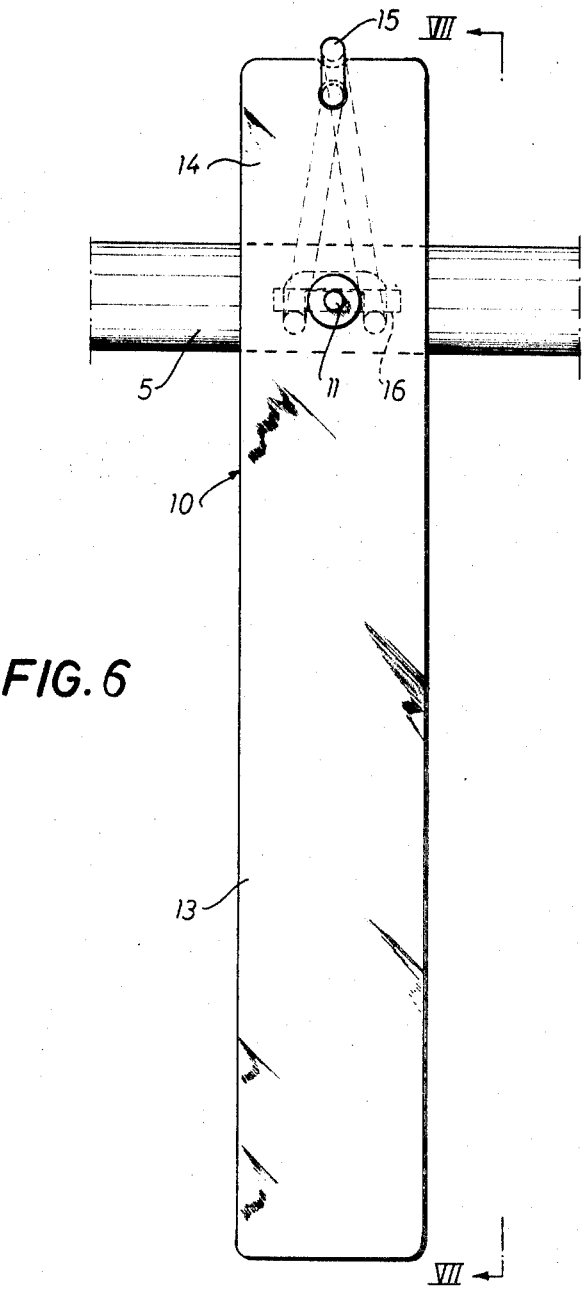
FIGURE 6 is a view from above to a still larger scale of a portion of one of the cross-pieces included in the roof portion of the superstructure showing one of the fold-forming arms.

An arrangement for collapsing and extending the covering is shown in FIGURES 2 and 5. At the front end of the load vehicle (see FIGURE 2) there is provided a winding drum 23 with a crank handle 22 for a wire 24, which is passed over a pulley 25 mounted at the top of the front end of the superstructure and which extends therefrom below the roof of the covering and has its free end connected to the rear cross-piece 5 in a manner more closely illustrated in FIGURE 5. In FIGURE 5 the plates 10 and 17 have been removed for showing underlying details. A piece of wire 26 extends alongside the rear cross-piece 5 and has its ends connected to the opposite ends of the cross-piece. To the middle of the wire 26 is secured a snap-hook 27 to which the wire 24 is detachably connected by means of a ring or eye 28. For pushing the covering to the position shown in FIGURE 2 the crank handle 22 is rotated for winding the wire 24 onto the winding drum 23, whereat the rear cross-piece 5 to which the wire 24 is connected will be pulled forwardly until the front bent-around end portions 8 of the plates 7 carrying the rollers 6 of the cross-piece abut against the respective rear bent-around end portions 9 of the plates 7 of the adjacent cross-piece 5. The latter cross-piece is then brought along in the continued movement and the portions 8 of said last-mentioned cross-piece will in turn abut against the portions 9 of the next cross-piece and so on, so that the covering will be successively pushed together from the rear end during which, for each cross-piece which is displaced forwardly towards and against the next cross-piece in front thereof, there will be formed an upwardly directed fold in the roof portions of the covering between said cross-pieces by the influence of the plates 10 and 17 in the manner described above. For extending the covering from the collapsed position shown in FIGURE 2 to the position covering the loading space the wire 24 is detached from the rear cross-piece by disengaging the eye or ring 28 from the snap-hook, whereafter the wire is extended horizontally to a pulley 29 (shown in FIGURE 2 only) provided at the top of the rear end of the superstructure, the wire being passed around said pulley and thereafter returned horizontally as indicated in broken lines in FIGURE 2 to the rear cross-piece which in the collapsed condition of the covering is disposed adjacent the front end of the trailer, the wire being reconnected to said rear cross-piece by engaging the eye or ring 28 in the snap-hook 27. By rotation of the crank handle 22 the covering is thereafter extended to the position shown in FIGURE 1 covering the loading space.

The embodiment described hereinabove and shown in the drawings is intended as an example only, the details of which may be varied within the scope of the appended claims. Thus the shape of the fold-forming arms as well as their pivoting connection to the cross-pieces may be varied. The rubber cords acting on said arms may of course be replaced by draw-springs or the like. In the embodiment shown, the fold-forming arms point in the direction towards which the covering is adapted to be displaced, but it should be obvious that the same advantages would be obtained if the arms were pointing in the opposite direction. Further, it is not necessary to have all arms pointing in the same direction. It is also possible to provide each or some of the cross-pieces with arms pointing in both directions. Also the number of arms on each cross-piece may of course be varied, and the invention is not limited to such details as for instance the lateral projection on the outer arms 17 on each cross-piece.

What I claim is:

1. A superstructure for load vehicles and comprising a flexible covering supported by a frame, the roof portion of which comprises a number of cross-pieces which are connected to the cover in spaced relationship, said cross-pieces being supported at their ends by longitudinal rails or the like in such a manner that the cross-pieces are displaceable for collapsing the covering, characterised in that said cross-pieces are provided with arms pivoted thereon and extending transversely of said cross-pieces and which are influenced by a force which tends to swing the arms upwardly, so that when the cross-pieces are displaced for collapsing the covering, the portions thereof disposed between the cross-pieces will be brought upwardly by said arms for forming folds disposed above a plane through said cross-pieces.

2. A superstructure as claimed in claim 1, characterised in that each of said arms is constituted by one arm of a double-armed lever pivoted on the respective cross-piece, the second and shorter arm of said lever being connected to one end of a draw-spring or the like, the opposite end of which is secured to an attachment projecting from the cross-piece.

3. A superstructure as claimed in claim 1, characterised in that each cross-piece is provided with several fold-forming arms distributed along the cross-piece.

4. A superstructure as claimed in claim 1, characterised in that the length of said arms is equal to or slightly less than half the distance between two adjacent cross-pieces in the extended condition of the covering.

5. A superstructure as claimed in claim 1, characterised in that the arms have their free ends directed towards that end of the superstructure towards which the cross-pieces are adapted to be displaced for collapsing the covering.

6. A superstructure as claimed in claim 1, characterised in that each cross-piece is provided with two arms disposed one adjacent each end of the cross-piece.

7. A superstructure as claimed in claim 1, characterised in that each cross-piece is provided with two arms disposed one adjacent each end of the cross-piece and each being provided at its free end with a lateral projection directed towards the adjacent side-wall portion of the covering.

8. A superstructure for load vehicles and comprising a flexible covering supported by a frame, the roof portion of which comprises a number of cross-pieces which are connected to the cover in spaced relationship, said cross-pieces being supported at their ends by longitudinal rails or the like in such a manner that the cross-pieces are displaceable for collapsing the covering, characterised in that said cross-pieces are provided with arms pivoted thereon and extending transversely of said cross-pieces and which are influenced by a force which tends to swing the arms upward, so that when the cross-pieces are displaced for collapsing the covering, the portions thereof disposed between the cross-pieces will be brought upwardly by said arms for forming folds disposed above a plane through said cross-pieces, each cross-piece being provided with an abutment adapted, when the cross-piece is displaced for collapsing the covering, to cooperate with abutments provided on the adjacent cross-piece.

9. A superstructure as claimed in claim 8, characterised by a wire which is detachably connected at one end to the rear cross-piece and extends along the underside of the covering to a winding-up device provided at the front end of the vehicle, a pulley being provided at the rear end of the vehicle, said wire being adapted to be passed around said pulley for extending the covering from the collapsed position.

10. A superstructure as claimed in claim 8, characterised by a wire which is connected at one end to the rear cross-piece and extends along the underside of the roof portion of the covering to a winding-up device provided at that end of the vehicle towards which the cross-pieces are adapted to be displaced for collapsing the covering.

11. A superstructure for load vehicles and comprising a flexible covering supported by a frame, the roof portion of which comprises a number of cross-pieces which are connected to the cover in spaced relationship, said cross-pieces being supported at their ends by longitudinal rails or the like in such a manner that the cross-pieces are displaceable for collapsing the covering, characterised in that said cross-pieces are provided with arms pivoted thereon and extending transversely of said cross-pieces, each of said arms being constituted by one arm of a double armed lever in the form of an elongated plate disposed above and pivoted on the respective cross-piece, the second and shorter arm of said lever being connected to one end of a draw spring or the like, the opposite end of which is secured to an attachment projecting from the cross-piece, said draw spring or the like urging said arms to swing upwardly, so that when the cross-pieces are displaced for collapsing the covering, the portions thereof disposed between the cross-pieces will be brought upwardly by said arms for forming folds disposed above a plane through said cross-piece.

12. A superstructure as claimed in claim 11, characterised in that said lever is pivoted on the cross-piece by means of a pin or the like projecting from the lower side of the lever, said pin engaging in an opening in the cross-piece, said opening having such dimensions that the pin is rockable therein for allowing the lever to swing relative to the cross-piece.

References Cited

UNITED STATES PATENTS 2,974,999  3/1961  Stuart _____ 296—100

FOREIGN PATENTS 578,111  7/1931  Germany.

PHILIP GOODMAN, *Primary Examiner.*